April 20, 1954     J. I. YELLOTT     2,675,676
PULVERIZED FUEL GAS TURBINE POWER PLANT
Filed Nov. 17, 1950     5 Sheets-Sheet 1

Fig. 1.

INVENTOR
JOHN I. YELLOTT
BY
Frederick A. Norton
ATTORNEY

April 20, 1954 J. I. YELLOTT 2,675,676
PULVERIZED FUEL GAS TURBINE POWER PLANT
Filed Nov. 17, 1950 5 Sheets-Sheet 2

INVENTOR
John I. Yellott
BY
Frederick A. Norton
ATTORNEY

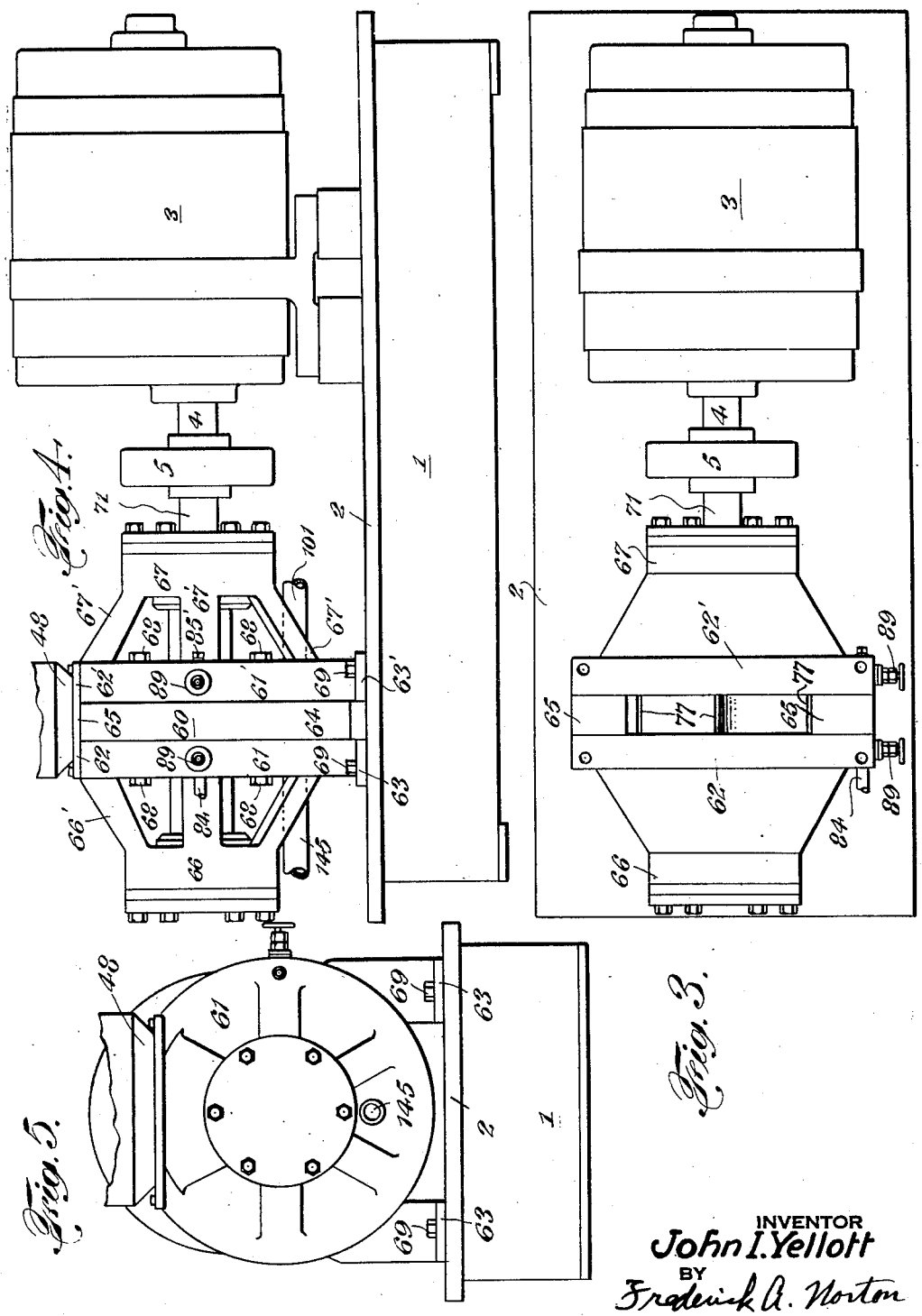

April 20, 1954  J. I. YELLOTT  2,675,676
PULVERIZED FUEL GAS TURBINE POWER PLANT
Filed Nov. 17, 1950  5 Sheets-Sheet 4

INVENTOR
John I. Yellott
BY
Frederick A. Norton
ATTORNEY

April 20, 1954  J. I. YELLOTT  2,675,676
PULVERIZED FUEL GAS TURBINE POWER PLANT
Filed Nov. 17, 1950  5 Sheets-Sheet 5

INVENTOR
John I. Yellott
BY
Frederick A. Norton
ATTORNEY

Patented Apr. 20, 1954

2,675,676

UNITED STATES PATENT OFFICE 2,675,676

PULVERIZED FUEL GAS TURBINE POWER PLANT

John I. Yellott, Baltimore, Md., assignor to Bituminous Coal Research, Inc., Washington, D. C., a corporation of Delaware Application November 17, 1950, Serial No. 196,288

13 Claims. (Cl. 60—39.46)

This invention relates to improvements in coal-burning gas turbine power plants wherein all storage of fuel and ash is accomplished at atmospheric pressure and all operations, including fuel preparation, other than combustion and ash separation, are likewise conducted at atmospheric pressure.

In the variable load operation of gas turbines, as for example in locomotive operation, the pressure in the gas turbine system varies widely. Thus, the pressure may vary from about 15 lbs. gauge, at idling speed, to about 55 lbs. gauge at full load. As a consequence all efforts to feed pulverized fuel from a container at those variable pressures have resulted in defeat because of the effect of pressure variation upon any feeding and controlling device.

I have now found that pulverized coal can be successfully burned under all operating conditions by keeping the preparation and feeding of the coal at the one pressure which remains constant in a gas turbine system under varying loads—atmospheric pressure. The continuous pressurizing of the coal, at whatever rate may be established by the feeder, is handled by an improved rotary coal and solids transfer pump in which compressed air flowing in a conveying air line carries pulverized coal from the bottom of the pump to the pressurized combustor. The pump rotor merely transports coal from an atmospheric pressure zone to a high pressure zone. Thus, the variable speed drive on the coal feeder acts as a throttle for overall plant control.

In the novel system herein, coal preparation involves the delivery of lump coal from a bunker to a pulverizer and conveying of the pulverized coal to a coal separator mounted on top of a pulverized coal storage tank. The coal level in the tank is controlled by a level indicator which controls the stoker feed. A variable-speed feeder controls the rate of coal flow from the tank. The coal in the storage tank is highly aerated and its bulk density runs as low as 20 lbs. per cubic foot. Also, it is fluidized to such an extent that it will readily flow as a labile fluid. The rotary coal pump herein permits the continuous pressurizing of the fluidized coal at whatever rate it is fed, minimizing time delays, thereby permitting the controlling of the system without long time lags between the actuation of the coal feeding device and the response of the turbine. This condition makes for true throttle control, which is of utmost importance in the operation of locomotives, and makes the power plants herein especially suited for such use.

By the use of turbine exhaust gases for drying of bunker coal the unitary power plant herein is rendered capable of utilizing any kind of coal which can be loaded into the bunker and which then can be processed into condition, always at atmospheric pressure, where it can be fed into the combustor and burned.

In my Patent 2,491,435 of December 13, 1949, for Gas Turbine Exhaust Steam Generators, and its parent application, Ser. No. 691,307, filed August 17, 1946, now Patent No. 2,651,176, for Coal Fired Gas Turbine Power Plants, the use of hot turbine exhaust gases for drying of bunker coal is disclosed. In my co-pending application, Ser. No. 130,215, filed November 30, 1949, now Patent No. 2,652,687, for Gas Turbine Power Plant Solid Fuel Feeding Means, I have disclosed and claimed a rotary solids transfer pump for handling non-pulverized crushed coal, an improved form of which is incorporated in the system herein.

It is, therefore, among the features of novelty and advantage of the present invention to provide an improved coal burning gas turbine power plant, having a high pressure combustion system incorporating a continuous ash blowdown; an atmospheric mill converting bunker coal to pulverized coal; and an atmospheric storage tank for powdered coal coupled to a combustor through a high pressure conveying air line, by means of a solids transfer pump.

Other features of novelty and advantage of the present invention include a rotary solids transfer pump of improved construction and efficiency; a series connected, multiple ash separator, including a first, louver type separator, and a second fine ash separator; parallel, secondary ash separators, severally incorporating a first blowdown line for the removal and cooling of uncombusted fuel particles and agglomerates from the first primary separator, and a second blowdown line for the fine ash from the second primary separator, said blowdown lines discharging, as injectors, into a main ash removal line, whereby inspirated air cools the separated ash and uncombusted particles, being heated thereby, and may then be used to dry bunker coal fed to the mill.

The above and other desirable features of novelty and advantage of the present invention will be more clearly understood by reference to the drawings and accompanying description, in which a preferred form of the system herein, and the component elements thereof, are shown by way of example only.

In the drawings, like numerals refer to similar parts throughout the several views, of which Fig. 1 is a schematic showing of a power plant incorporating the novel coal preparation elements, with atmospheric pulverizing mill and feeding into a high pressure combustion system, together with multiple ash separators arranged for continuous blowdown of hot ash and other solids from the gas turbine motive fluid supply;

Fig. 3 is a top plan view of the improved non-flooding solids transfer pump of the system of Fig. 1, with its driving motor;

Fig. 4 is a front elevation of the pump and motor of Fig. 3;

Fig. 5 is an end elevation of the solids pump;

Figure 2:
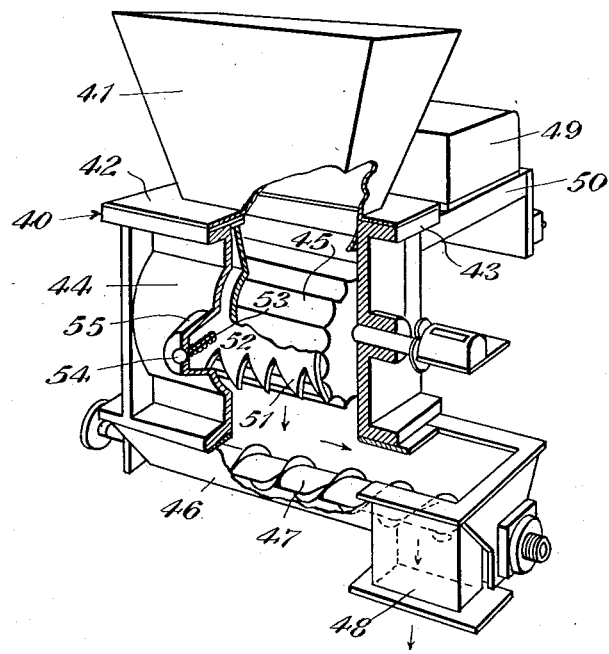
Fig. 2 is an elevation, partly in broken section, of a coal feeder as used in the power plant of Fig. 1.

Turning now to the drawings, and with particular reference to the showing of Fig. 1, there is shown a power plant of the gas turbine driven, generating electric type, in which bunker coal is preliminarily crushed and dried, then pulverized in an atmospheric mill, and fed to an atmospheric storage tank incorporating a solids separator. From this tank it is delivered, at a controlled rate, into the hopper of a special, rotary solids transfer pump, which discharges the pulverized coal into the pressurized conveying air line leading to the combustor of the gas turbine system.

The improved system herein comprises a pulverized coal preparation system including a coal bunker 10, an atmospheric pulverizer or mill 20, an atmospheric storage tank 30, for pulverized coal, and incorporating a cyclone separator with air return to the mill, a variable solids feeder 40, and a rotory solids transfer pump 60. The system also includes a combustor 100, discharging ash-bearing motive fluid through a multiple ash separator, designated generally by the numeral 110, wherein it is cleaned, and discharging cleaned motive fluid to a gas turbine 120 having an exhaust duct or stack, which incorporates a regenerator 130. A first, secondary air compressor 140 is coupled to and driven by the turbine, as is an electric generator 150. A multiple unit, continuous ash blowdown system, designated generally by the numeral 160, receives the air-borne ash discharging from the primary ash separators and delivers this ash through cooling oil injectors to cooled ash separator means having a discharge line discharging quenched ash, at atmospheric pressure to ash storage means.

Referring more particularly to Fig. 1, the bunker 10 comprises a body portion 11 with a sloping bottom 12 and a discharge trough 13, housing a feeder screw, not shown, which is driven by motor 14 through shaft 15. Preliminary crushing of the bunker coal is effected in the discharge trough by the feeder screw, the crushed coal being delivered into pulverizer 20 through line 16. Inlet and outlet connections 17 and 18 are provided for the screw feeder trough 13. Optionally, hot air for drying the bunker coal may be supplied to inlet 17 from the exhaust 130 from turbine 120, as disclosed in my Patent 2,491,435, above referred to. The inlet line 17 may be tapped into the hot air discharge line 174, from the ash separator system, as will be described more in detail hereinafter. The mill 20 includes a casing 21 housing the crushing mechanism, which is continuously driven by motor 22 through drive mechanism 23. A fan, not shown, is housed in the upper section 24 of the housing. A discharge line 25 connects the upper section of the mill with a solids separator in the top of pulverized coal storage tank 30, and a return line 26 connects the separator with the fan casing, whereby a continuous circulation of air is effected between the mill and the separator. The solids separator of tank 30 is provided with a bleed or vent line 27 in fluid communication with vent line 174 from the ash separating system. The storage tank 30 comprises a closed body section 31 having a sloping bottom 32 mounted on and discharging into the variable feeder 40. A level control 33, of the paddle type, is mounted in the storage tank and is connected to lower and upper level controls 34, 35, respectively, which are connected, through control line 36, to the stoker motor 14, whereby the stoker is set in operation only when the pulverized coal in tank 30 drops below a predetermined level. The feeder 40 and rotary transfer solids pump 60 discharge regulated amounts of pulverized coal into the combustor air feed line 101, of combustor 100, which includes an outer shell 102 and an inner combustion chamber 103, into which the combustive air-borne pulverized coal is delivered. Secondary air, compressed in compressor 140, is fed through plenum chamber 141 and regenerator 130, mounted in the turbine exhaust duct, into the combustor, where it flows into and around flame tube 103, cooling the same, and combines and mixes with the products of combustion to form an ash-carrying motive heated fluid. This motive fluid is passed through a first, louvre-type, ash separator 111, where most of the coarse and some of the fine ash is separated out, and through the second ash separator 112, where the fine ash is removed. The resulting, cleaned heated motive fluid is delivered, through duct 113 and turbine inlet line 121, to the turbine 120, where it expands, doing work, and discharges through the turbine exhaust duct, in heat-exchanging relation with the regenerator, to the atmosphere. A second air line 142 is tapped into plenum chamber 141 of the compressor discharge line and the air is raised in pressure by a second booster compressor 143, driven by electric motor 144. This compressed, primary air is delivered, through line 145, to the rotary transfer pump 60, where it picks up the regulated feed of pulverized coal to form a streaming entrainment of fluidized coal particles in a pressurized conveying air stream, which is delivered to the combustor through fuel-air feed line 101. The motor 144 may be driven at constant speed by direct current through line 152 from D. C. generator 151, coupled to main generator 150.

*Coal feeder*

Referring now to Fig. 2, there is shown a variable speed coal feeder, of the type known under the trade name of "Omega Feeder," made by Builders Iron Foundry, Providence, R. I. No claim is made to the specific details of this device, apart from its inclusion in the pulverized coal feeding system. The description will, therefore, be restricted to the details shown as illustrative of the improved control system herein.

The feeder, designated generally by the numeral 40, comprises a coal hopper 41, mounted on platform 42 supported on flanged top 43 of feeder casing 44. The casing 44 houses fluted rotor 45 and discharges into trough 46 mounting screw 47 which discharges into flanged outlet 48. A variable speed transmission 49 is mounted on supporting platform 50; and is operatively connected to rotor 45 and screw 47 through suitable driving connections, not shown. The hopper 41 is hermetically secured to the discharge hopper 32 of atmospheric coal storage tank 30, and to the mouth or inlet, of the novel coal pump 60. The rotor 45 is engaged by the conformed saw teeth 51 of plate 52 which is spring-biased by spring 53 held in place by pin 54, which is reciprocable in boss 55 of rotor casing 44.

Rotary solids transfer pump

The rotary solids transfer pump 60 and its accessories are shown in detail in Figs. 3 to 7, both inclusive. The pump and its driving motor 3, are mounted on a platform 2 of base or support 1. The driving shaft 4 of the motor is connected to shaft 71 of the rotor through flexible coupling 5.

Figure 6:
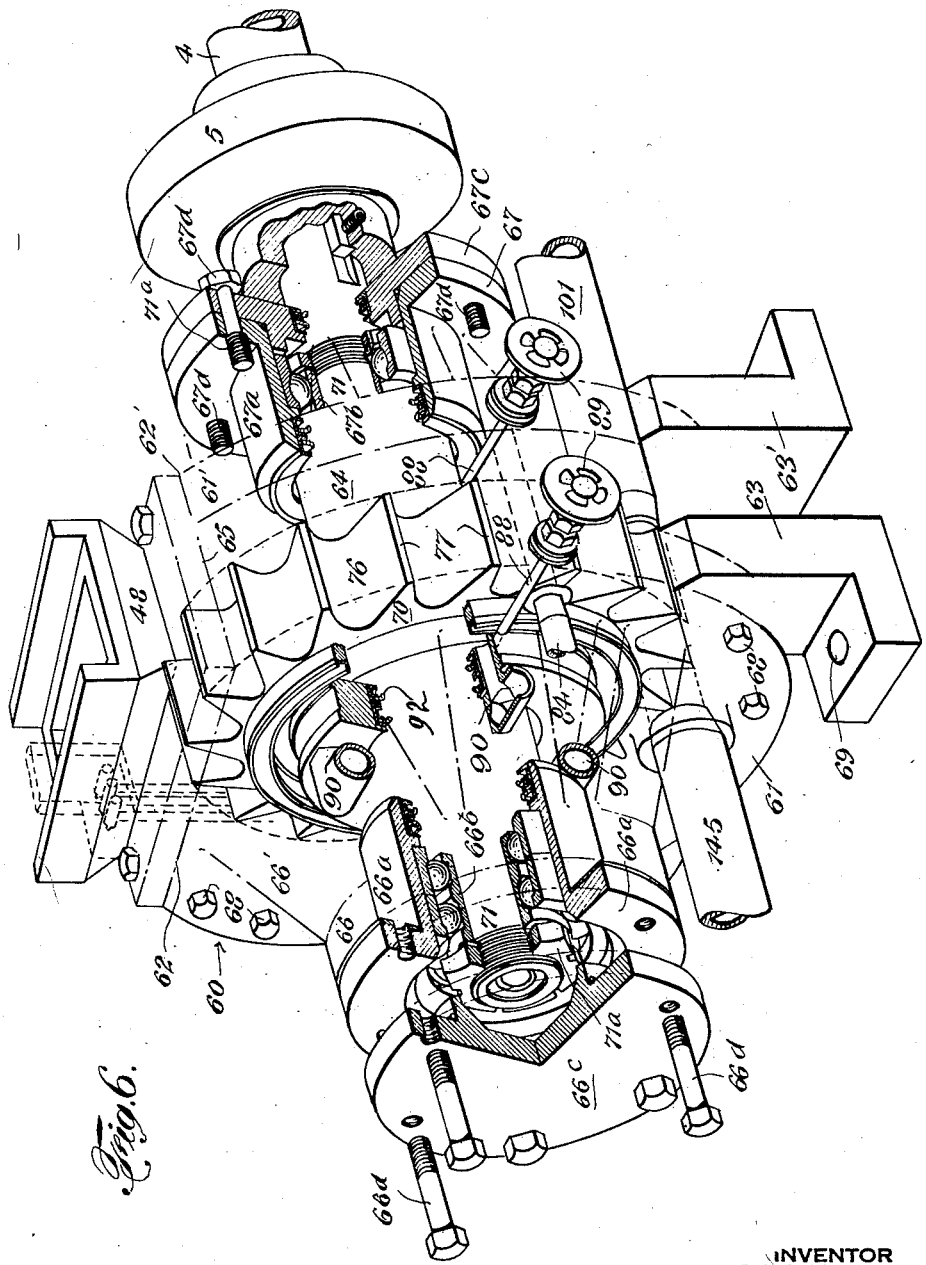
Fig. 6 is a phantom view, partly in broken section, of the solids pump.

Referring more particularly to Fig. 6, a pump will be seen to comprise a pair of symmetrical end plates 61, 61', of generally circular construction, having truncated flat top surfaces 62, 62', and supported on spaced legs 63, 63'. The body of the pump casing comprises an annular center casting or ring 64 having truncated top surface 65 in alignment with surfaces 62, 62' of the end plates, and forming a horizontal bearing surface therewith. Annular bearing housings 66, 67 are severally secured to and spaced from end plates 61, 61' by radially disposed spiders 66', 67'. Flanged thrust bearings 66a and 67a respectively mounting the stator cages of ball-bearings 66b and 67b severally secured on shaft 71, are locked in place by lock nuts 71a. End cap 66c is secured on and over member 66a by machine screws 66d. In like manner centrally apertured end plate 67c is secured to support 67 and collar 67a by machine screw 67d. The center casing 64 is secured in place in and between the end plates by any suitable means, such as fitted machine bolts 68. The supporting feet 63, 63' of the end plates are secured to the base support 1, by machine screw 69. As shown more in detail in Fig. 7, the rotor 70 of the pump is mounted on shaft 71 having an integral collar 72, fitting in socket 73 of the rotor and locked in place by bolt 74, tapped into hole 75. The rotor is provided with a plurality of peripheral pockets 76, having end faces 77, the pockets being set at a 45° angle, as more specifically set forth and claimed in my said application, Ser. No. 130,215, filed November 30, 1949, now Patent No. 2,652,687, for Gas Turbine Power Plant Solid Fuel Feeding Means. The lips 77 of the rotor pockets have close clearances with the inner face of center casting 64, the spacing being desirably of the order of one-half the average particle size of the material being handled. The faces of the rotor are cut away, as indicated generally at 78, to define bearing sections 79, extending from the roots of the rotor pockets inwardly to the recessed sections 73 of the rotor faces.

Annular sealing rings 80 of any suitable bearing or self-lubricating composition such as copper-graphite and provided with annularly serrated bearing faces 81 and annular backing rings 82 of flat channel cross-section, are mounted in grooves 83, 83', in the end plates 61, 61'. The sealing rings are maintained in positive bearing engagement against the bearing surfaces 79 of the rotor faces in the following manner. A pressure line 84 is tapped into duct 85 formed in and through the ring casing and end plates. A pair of ducts 86, 86' are tapped radially through duct 85 and inwardly in end plates 61, 61' to establish connection with the grooves 83, 83'. The ducts 86, 86' are provided with lead ducts 87, 87', normally sealed off and closed by spindles 88 of valves 89 secured in the faces of the end plates, as shown. The ducts 87, 87' open into channels 94 formed in bleed lines 90. The bleed lines 90 open into the spaces formed by and between the recessed faces 78 of the rotor and the cooperating inner faces of the end plates. Suitable sealing means, such as leather packing rings 92, are mounted on the shaft 71 and held in place by the usual annular packing supports 93. The vents 90 are vented to the atmosphere in any suitable manner.

Figure 7:
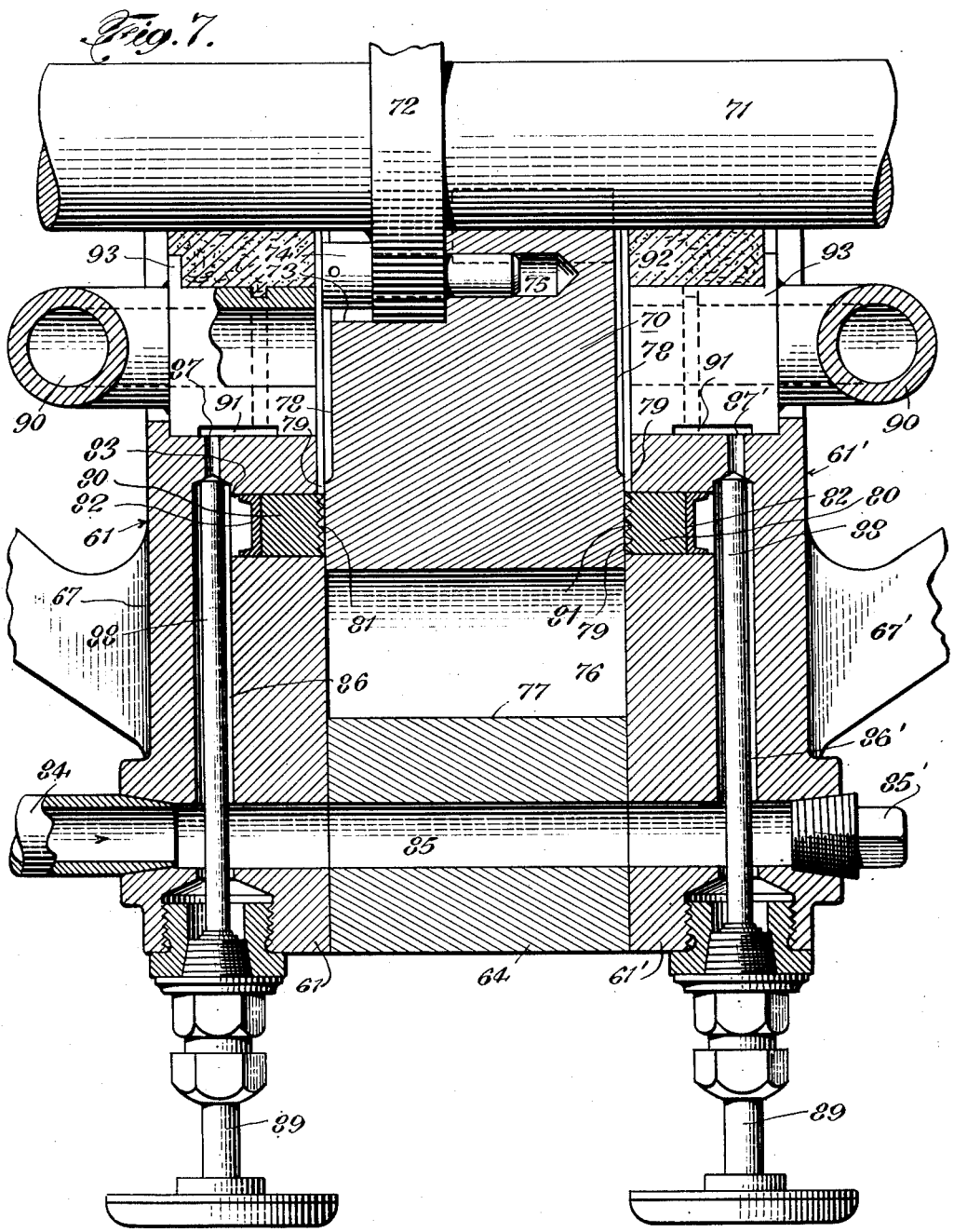
Fig. 7 is a half-section view of the pump taken through the horizontal axis of the rotor shaft.

With the novel rotor mounting shown, air, or other suitable fluid, at a pressure higher than that obtaining in line 145 is introduced into line 84. With the spindles 88 of valves 89 throttled down, as shown in Fig. 7, ducts 87, 87' are sealed off and fluid pressure is applied against the supporting rings 82 of the sealing members 80; thereby forcing the latter into sealing-bearing engagement against the bearing faces 79 of rotor 70. Because of the higher air pressure obtaining in ducts 86, 86', any leakage of air will be inwardly of the sealing members and radially outward across bearing faces 79 into the rotor pockets 76, whereby infiltration of pressure fluid-borne coal particles or the like, radially inward of the rotor faces, with consequent abrasion of the bearing surfaces, is prevented. By bleeding air through ducts 87, 87' into the vent lines 90, positive circulation of pressure fluid in and against the faces of the rotor is assured. Under certain circumstances it may be desirable to introduce a hydraulic fluid into line 84 and impose a more positive pressure seal between the bearing surfaces 79 and 81.

Ash separation with continuous blowdown

The ash separation system includes a first, coarse ash separator 111, preferably of the louvre type, in series with a second, fine ash separator 112 which delivers cleaned, pressurized motive gas to the turbine 120, through ducts 113 and 121. The continuous blowdown system 160, incorporates a pair of cyclone separators, 161, 162, an air injector ash conduit 170, and a cooled ash cyclone separator 172, fed by conduit 170. The cleaned air from the cooled ash separator discharges through a vent line 174 and pipe 17, to the feeder screw trough of the coal bunker, whereby the heated gases from the ash separation system can be used to dry the crushed coal delivered by the screw feeder to the pulverizing mill.

The cyclone separators of the blowdown system 160, comprise a first separator 161, and a second separator 162, severally provided with inlet lines 163, 164, cleaned gas outlet lines 165, 166, and separated ash discharge lines 167, 168. Inlet line 163, receives coarse ash, carried in gaseous motive fluid, from louvre separator 111, and discharges it tangentially into separator 161, wherein the solids are separated from the accompanying hot motive gas. The cleaned motive gas is discharged through outlet 165 to line 166 of separator 162. The separated solids are discharged into the common ash removal line 170, through discharge line 167. The outlet end of line 167 comprises a right-angle bend having a restricted discharge opening, or nozzle, 167', located in the central longitudinal axis of conduit 170. The discharge nozzle 168' of line 168 is centered in the mouth of conduit 170, whereby the gas issuing from nozzle 168' expands into conduit 170, acting as an injector, whereby cool, ambient air is inspirated into the line through its bell mouth 171. The inspirated air not only quenches the ash particles from separator 162, but also quenches the coarse ash and unburned combustible solids from separator 161. This quenching effect is due to the relatively large volume of air inspirated into conduit 170 by the pressurized gases expanding through injector nozzles 167', 168'. The volume of inspirated air is calculated to reduce the temperature of the entrained particulate and agglomerated solids, discharged from the combustion system (temp. about 1300° F.), down to about 400° F., which is a safe operating temperature for ash handling, being below the combustion threshold temperature of carbonaceous ash. The cleaned motive gases from the separators 161 and 162 discharge into turbine inlet line 113, wherein they are mixed with the main stream of motive fluid delivered to the turbine. Because of pressure losses through the ash separators, the pressure in the turbine feed line will be somewhat less than that obtaining in the line from the combustor to the ash separators. As a result of this condition, there will be a positive pressure difference exerted, at all times, on the secondary ash separators, and the ash from these separators will be discharged in pressurized gas streams, which flow through blowdown nozzles 167' and 168' into conduit 170. A certain amount of cooling of the ash takes pace in separators 111, 112, and in their respective discharge lines 163, 164, as well as in secondary separators 161, 162. The temperature of the cooling air inspirated into conduit 170 will be raised to about 400° F. by the entrained ash, which is separated out in separator 172, and discharged into ash receiver 173, wherein it may be stored without danger of combustion of unburned coal particles or agglomerates. The cleaned gas from the separator 172 is discharged through vent line 174 to the atmosphere or any suitable space heating device.

The line 174 is provided with valved connections 175, 176, respectively connected to vent line 27 of atmospheric, powdered coal storage tank 30, and to inlet line 17 of coal feeder trough 13. A continuous air circulation system, as obtains in mill 20 and storage tank 30, requires a certain amount of bleeding or venting, which is made possible by connecting line 27 to line 174. Any powdered coal discharged through line 27, will be passed through the coal in the screw feeder trough, along with the drying air from line 174, and will be separated out on the coarser coal particles.

It will now be appreciated that there has been provided a novel generating electric power plant, particularly adapted for use in coal burning locomotives and other installations having restricted space available, and which permits the use of bunker coal while permitting the pressurized combustion of the coal as a streaming entrainment of pulverized particles carried in a pressurized stream. The novel system herein is characterized further by the following improvements: pressurized combustion of fluidized solids with preliminary pulverization at atmospheric pressure; the use of a pressurized pneumatic conduit for delivering fluidized solids to a combustor, together with storage of the pulverized solids at atmospheric pressure and transfer of the pulverized solids from atmospheric pressure storage to a pressurized pneumatic conveyor by means of a solids transfer pump; and the continuous blowdown of ash separated from pressurized motive fluid together with quenching of the ash and storage at atmospheric pressure.

What is claimed is:

1. A generating electric power plant including a coal fired gas turbine, a generator driven by the turbine, a source of heated motive gases for the turbine including a first secondary air compressor driven by the turbine, a second primary air compressor, a coal bunker, a coal pulverizer fed from the bunker, atmospheric pressure pulverized coal storage means, a pressurized combustor, a pressurized pulverized coal feed line from the coal storage means to the pressurized combustor incorporating a variable delivery, pulverized coal feeder and a constant speed rotary solids transfer pump, said feeder discharging into said feed line through said pump, pneumatic conduit means delivering high pressure primary air from the second compressor to the pulverized coal feed line, pneumatic conduit means delivering low pressure secondary air from the first compressor to the combustor, and duct means delivering heated motive gases from the combustor to the turbine and incorporating continuous blowdown, multiple ash separating means.

2. A generating electric power plant including a coal fired gas turbine, a generator driven by the turbine, a source of heated motive gases for the turbine including a first secondary air compressor driven by the turbine, a second primary air compressor, a coal bunker, a coal pulverizer fed from the bunker, atmospheric pulverized coal storage means, a pressurized combustor, a pressurized solids feed line from the atmospheric coal storage means to the pressurized combustor incorporating a variable delivery, pulverized coal feeder and a constant speed rotary solids transfer pump, said feeder being at atmospheric pressure and discharging into the said pressurized feed line through said pump, pneumatic conduit means delivering high pressure primary air from the second compressor to the pressurized pulverized coal feed line, pneumatic conduit means delivering low pressure secondary air from the first compressor to the combustor, means delivering heated motive gases from the combustor to the turbine and incorporating continuous blowdown, multiple ash separating means, and means for regeneratively heating the low pressure air delivered from the first compressor to the combustor.

3. A generating electric power plant including a coal fired gas turbine, a generator driven by the turbine, a source of heated motive gases for the turbine including a first secondary air compressor driven by the turbine, a second primary air compressor, a coal bunker, a coal pulverizer fed from the bunker, atmospheric pulverized coal storage means, a pressurized combustor, a pulverized coal feed line from the coal storage means to the combustor incorporating a variable delivery, pulverized coal feeder and a constant speed rotary transfer pump, said feeder discharging into the said feed line through said pump, pneumatic conduit means delivering high pressure primary air from the second compressor to the pulverized coal feed line through the said pump, whereby a combustible, streaming entrainment of primary air-borne pulverized coal particles is formed and delivered to the pressurized combustor, pneumatic conduit means delivering low pressure secondary air from the first compressor to the combustor, means delivering heated motive gases from the combustor to the turbine and incorporating a plurality of series connected ash separating means, means for delivering heated gases from the ash separators to the coal bunker, whereby to dry coal fed to the coal pulverizer, and means for regeneratively heating the low pressure air delivered from the first compressor to the combustor.

4. A generating electric power plant including a gas turbine, a generator and a first secondary air compressor driven by the turbine, a source of heated motive gases for the turbine, including said first air compressor, a second, primary air compressor delivering primary air at higher pressure than the secondary air, a coal bunker, a coal pulverizer fed from the bunker, atmospheric pulverized coal storage means, a pressurized combustor, means for delivering pulverized coal from the said storage means to a pneumatic conduit feed line, comprising a gravity feeder discharging into a rotary pump, said rotary pump having discharge means registering with and in said pneumatic conduit, means delivering air from the second compressor to said pneumatic conduit through said pump, whereby to form a combustible streaming entrainment of air-borne fluidized coal particles in a combustive air stream, means for delivering said stream of combustive air-borne coal particles to the combustor, regenerative air heating means delivering low pressure air from the first compressor to the combustor, and means delivering heated motive gases from the combustor to the turbine and including multiple ash separating means with air injector discharge means, whereby a continuous blowdown and concomitant cooling of separated ash is effected.

5. A generating electric power plant including a gas turbine, a generator driven by the turbine, a source of heated motive gases for the turbine, including a first, secondary air compressor, a second, primary air compressor, a coal bunker, a coal pulverizer fed from the bunker, atmospheric pulverized coal storage means, a pressurized combustor, means for delivering pulverized coal from the said storage means to a high pressure pneumatic conduit feed line, comprising a gravity feeder discharging into a rotary pump, said rotary pump having discharge means registering with and in said pneumatic conduit, means for delivering air from the first compressor to the second compressor, whereby to increase the pressure of the primary air above that of the secondary air, means delivering high pressure air from the second compressor to said pneumatic conduit, whereby to form a combustible streaming entrainment of air-borne fluidized coal particles in a combustive air stream, means for delivering said combustive air-borne coal particles to the combustor, regenerative air heating means delivering heated air from the first compressor to the combustor, means delivering heated motive gases from the combustor to the turbine, including continuous blowdown, multiple ash separating means, and a cleaned gas return line from the blowdown separators to the turbine feed line.

6. A generating electric power plant including a gas turbine, a generator driven by the turbine, a source of heated motive gases for the turbine, including a first, low-pressure secondary air compressor, a second, high-pressure primary air compressor, a coal bunker, a coal pulverizer fed from the bunker, atmospheric pulverized coal storage means, a pressurized combustor, means for delivering pulverized coal from the said storage means to a high-pressure pneumatic conduit feed line, comprising a gravity feeder discharging into a rotary pump, said rotary pump having discharge means registering with and in said pneumatic conduit, means for delivering air from the first compressor to the second compressor, whereby to increase the pressure of the primary air above that of the secondary air, means delivering air from the second compressor to said pneumatic conduit, whereby to form a combustible streaming entrainment of air-borne fluidized coal particles in a combustive air stream, means for delivering said combustive air-borne coal particles to the combustor, regenerative air heating means delivering heated air from the first compressor to the combustor, means delivering heated motive gases from the combustor to the turbine and including continuous blowdown, multiple ash separating means comprising a first, coarse ash separator, and a second, fine ash separator, separate ash discharge means for said separators, said ash discharge means including an air injector line, whereby the ash is cooled by inspirated, cool ambient air, means for separating cooled ash from the ambient cooling fluid, and means for delivering the now heated cooling fluid to the coal bunker stoker, whereby to dry the bunker coal fed to the pulverizer.

7. A generating electric power plant including a gas turbine, a generator and a first air compressor driven by the turbine, a source of heated motive gases for the turbine, including said first compressor, a second air compressor, means for delivering air from the first comperssor to the second compressor, a coal bunker, a coal pulverizer fed from the bunker, pulverized coal storage means, a combustor, means for delivering pulverized coal from the said storage means to a pneumatic conduit feed line, comprising a gravity feeder discharging into a rotary pump, said rotary pump having discharge means registering with and in said pneumatic conduit, means delivering air from the second compressor to said pneumatic conduit, whereby to form a streaming entrainment of air-borne fluidized coal particles in a combustive air stream, means for delivering said combustive air-borne pulverized coal to the combustor, regenerative air heating means delivering heated air from the first compressor to the combustor, means delivering heated motive gases from the combustor to the turbine and including continuous blowdown multiple ash separating means, comprising a first, coarse ash separator, and a second, fine ash separator, common cleaned air discharge means and separate ash discharge means for said separators, said ash discharge means including an air injector line, whereby the ash is cooled, means for separating cooled ash from the ambient cooling fluid, and means for delivering the now heated cooling fluid to the coal bunker stoker, whereby to dry the bunker coal fed to the pulverizer.

8. A generating electric power plant particularly adapted for use in coal burning locomotives including a coal fired power plant incorporating a gas turbine, a generator driven by the turbine, a source of heated motive gases for the turbine including a first low-pressure, compressed secondary air source, a second high-pressure, compressed primary air source, a coal bunker, a coal pulverizer fed from the bunker, atmospheric pulverized coal storage means, a pressurized combustive unit, a pulverized coal feed line from the coal storage means to the combustive unit, pneumatic conduit means delivering air from the second air source to the pulverized coal feed line, pneumatic conduit means delivering compressed air from the first air source to the combustive unit, means delivering heated motive gases from the combustive unit to the turbine and incorporating multiple ash separating means in advance of the turbine, and injector means for delivering stripped heated gases from the ash separating means to the coal bunker, whereby to dry coal fed to the coal pulverizer, said pulverizer coal feed line including a rotary coal transfer pump, whereby pulverized coal is transferred from the atmospheric pulverized coal storage means to the pressurized combustive unit as a combustible streaming entrainment of air-borne fluidized coal particles in a pressurized air stream.

9. Generating electric power plant according to claim 8, characterized by the fact that the multiple ash separating means comprises a first conical louver separator for coarse ash and a second fine ash separator, both of the separators incorporating ash blow-down lines separately discharging into vortical whirl ash concentrators, means delivering cleaned gas from the concentrators to the cleaned motive fluid line to the turbine, each said separator further incorporating a concentrated ash blow-down line, said blow-down lines severally terminating in discharge nozzles embouched in the injector means.

10. Generating electric power plant according to claim 8, characterized by the fact that the injector means for delivering stripped heated gases from the ash separating means to the coal bunker incorporates ash separating means which receives cooled air-borne ash from the injector, the cooled ash being separated and delivered to storage, and the cleaned heated gases being delivered to the coal bunker.

11. A generating electric power plant particularly adapted for use in coal burning locomotives, including a coal fired power plant incorporating a gas turbine, mechanical power take-off means driven by the turbine, a source of heated motive gases for the turbine including a first, low-pressure, compressed secondary air source, a second, high-pressure, compressed primary air source, a coal bunker, a coal pulverizer fed from the bunker, atmospheric pulverized coal storage means, a pressurized combustive unit, a pulverized coal feed line from the coal storage means to the combustive unit, pneumatic conduit means delivering air from the second air source to the pulverized coal feed line, pneumatic conduit means delivering compressed air from the first air source to the combustive unit, means delivering heated motive gases from the combustive unit to the turbine and incorporating continuous blowdown, multiple ash separating means in advance of the turbine, said pulverized coal feed line including a rotary coal transfer pump, whereby pulverized coal is transferred from the pulverized coal storage means to the combustive unit as a combustion-supporting streaming entrainment of air-borne fluidized coal particles in a pressurized combustive air stream.

12. A generating electric power plant particularly adapted for use in coal burning locomotives including a coal fired power plant incorporating a gas turbine, mechanical power take-off means driven by the turbine, a source of heated motive gases for the turbine including a first, low-pressure, compressed secondary air source, a second, high-pressure, compressed primary air source, a coal bunker, a coal pulverizer fed from the bunker, atmospheric pulverized coal storage means, a pressurized combustive unit, pneumatic conduit means delivering compressed air from the second air source to the pulverized coal feed line, pneumatic conduit means delivering compressed air from the first air source to the combustive unit, means delivering heated motive gases from the combustive unit to the turbine and incorporating multiple ash separating means in advance of the turbine, and means for delivering stripped gases from the ash separating means to the coal bunker, whereby to dry coal fed to the coal pulverizer, said pulverized coal feed line including a rotary coal transfer pump, whereby pulverized coal is transferred from the atmospheric pulverized coal storage means to the pressurized combustive unit as a combustible streaming entrainment of air-borne fluidized coal particles in a pressurized combustive air stream.

13. A generating electric power plant particularly adapted for use in coal burning locomotives including a coal fired power plant incorporating a gas turbine, mechanical power take-off means driven by the turbine, a source of heated motive gases for the turbine including a first, low-pressure, compressed secondary air source, a second, high-pressure, compressed primary air source, a coal bunker, a coal pulverizer fed from the bunker, atmospheric pulverized coal storage means, a pressurized combustive unit, a pulverized coal feed line from the coal storage means to the combustive unit, pneumatic conduit means delivering compressed combustive air from the second primary air source to the pulverized coal feed line, pneumatic conduit means delivering compressed air from the first air source to the combustive unit, means delivering heated motive gases from the combustive unit to the turbine and incorporating multiple ash separating means with an air injector continuous blowdown line, in advance of the turbine, and means for delivering stripped gases from the blowdown line to the coal bunker, whereby to dry coal fed to the coal pulverizer, said pulverized coal feed line including a rotary coal transfer pump, whereby pulverized coal is transferred from the atmospheric pulverized coal storage means to the pressurized combustive unit as a combustible streaming entrainment of air-borne fluidized coal particles in a pressurized air stream.

References Cited in the file of this patent

UNITED STATES PATENTS

| Number | Name | Date |
|---|---|---|
| 551,074 | De Camp | Dec. 10, 1895 |
| 730,782 | Morrison | June 9, 1903 |
| 1,180,792 | Norrman | Apr. 25, 1916 |
| 1,319,119 | Schutz | Oct. 21, 1919 |
| 1,771,497 | Mayr | July 29, 1930 |
| 1,778,774 | Rice et al. | Oct. 21, 1930 |
| 1,897,478 | Holzwarth | Feb. 14, 1933 |
| 2,226,923 | Cross | Dec. 31, 1940 |

FOREIGN PATENTS

| Number | Country | Date |
|---|---|---|
| 413,697 | Great Britain | July 18, 1934 |
| 484,289 | Great Britain | May 3, 1938 |
| 541,845 | Great Britain | Dec. 15, 1941 |